US009286099B2

(12) United States Patent
Cai

(10) Patent No.: US 9,286,099 B2
(45) Date of Patent: Mar. 15, 2016

(54) BALANCING VIRTUAL MACHINE LOADS

(71) Applicant: Hangzhou H3C Technologies Co., LTD., Hangzhou, Zhejiang (CN)

(72) Inventor: Zhifeng Cai, Beijing (CN)

(73) Assignee: HANGZHOU H3C TECHNOLOGIES CO., LTD., Zhejiang (CN)

( * ) Notice: Subject to any disclaimer, the term of this patent is extended or adjusted under 35 U.S.C. 154(b) by 73 days.

(21) Appl. No.: 14/345,653

(22) PCT Filed: Nov. 22, 2012

(86) PCT No.: PCT/CN2012/085028
§ 371 (c)(1),
(2) Date: Mar. 19, 2014

(87) PCT Pub. No.: WO2013/075640
PCT Pub. Date: May 30, 2013

(65) Prior Publication Data
US 2014/0229949 A1 Aug. 14, 2014

(30) Foreign Application Priority Data

Nov. 22, 2011 (CN) .......................... 2011 1 0373058

(51) Int. Cl.
G06F 9/46 (2006.01)
G06F 9/455 (2006.01)
G06F 9/50 (2006.01)

(52) U.S. Cl.
CPC .......... *G06F 9/45533* (2013.01); *G06F 9/5011* (2013.01); *G06F 9/5033* (2013.01); *G06F 9/5088* (2013.01)

(58) Field of Classification Search
CPC ........................ G06F 9/5011; G06F 2009/4557
See application file for complete search history.

(56) References Cited

U.S. PATENT DOCUMENTS

2006/0069761 A1* 3/2006 Singh et al. .................... 709/222
2010/0274890 A1 10/2010 Patel et al.
2010/0332657 A1 12/2010 Elyashev et al.
2012/0011254 A1* 1/2012 Jamjoom et al. ............... 709/226

FOREIGN PATENT DOCUMENTS

CN 101504620 8/2009
CN 101593133 12/2009
(Continued)

OTHER PUBLICATIONS

International Search Report and Written Opinion dated Mar. 7, 2013 issued on PCT Patent Application No. PCT/CN2012/085028, State Intellectual Property Office, the P.R. China.

*Primary Examiner* — Camquy Truong
(74) *Attorney, Agent, or Firm* — Mannava & Kang, P.C.

(57) ABSTRACT

A method for balancing virtual machine loads is provided. The method comprises: monitoring load information of each of physical hosts and virtual machines operating on said physical hosts; calculating load index of each of said physical hosts and said virtual machines operating on said physical hosts respectively according to said load information; based on load index of each physical hosts, determining a source physical host on which any virtual machine needs to be migrated so as to reduce the load index of the source physical host; determining a target virtual machine to be migrated on the source physical host based on load index of each virtual machines on the source physical host and respective affinity factor indicating a degree of dependency of a virtual machine on a physical host on which it resides; and migrating the target virtual machine into a destination physical host different than the source physical host.

15 Claims, 2 Drawing Sheets

(56) References Cited

FOREIGN PATENT DOCUMENTS

| | | |
|---|---|---|
| CN | 102096601 | 6/2011 |
| CN | 102110014 | 6/2011 |
| CN | 102187315 | 9/2011 |
| CN | 102508718 | 6/2012 |

* cited by examiner

BALANCING VIRTUAL MACHINE LOADS

The present application is a 371 application of International Application No. PCT/CN2012/085028 filed on Nov. 22, 2012 and entitled "Balancing Virtual Machine Load," which claims the benefit of Chinese Patent Application No. 201110373058.7 filed on Nov. 22, 2011.

BACKGROUND

With the development of various technologies of computer and network, various computation resources, memory resources, data resources, software resources and service resources are aggregated in the network. By using virtual machine technology, these dispersed resources can be integrated more effectively so as to realize sharing and effective utilization of resources and to reduce energy consumption.

BRIEF DESCRIPTION OF THE DRAWINGS

The accompanying drawings illustrate various examples of various aspects of the present disclosure. It will be appreciated that the illustrated element boundaries (e.g., boxes, groups of boxes, or other shapes) in the figures represent one example of the boundaries. It will be appreciated that in some examples one element may be designed as multiple elements or that multiple elements may be designed as one element. In some examples, an element shown as an internal component of another element may be implemented as an external component and vice versa.

DETAILED DESCRIPTION

As used herein, the term "includes" means includes but not limited to, the term "including" means including but not limited to. The term "based on" means based at least in part on. In addition, the terms "a" and "an" are intended to denote at least one of a particular element.

In the following, certain examples of the present disclosure will be described in detail with reference to the drawings.

Figure 1:
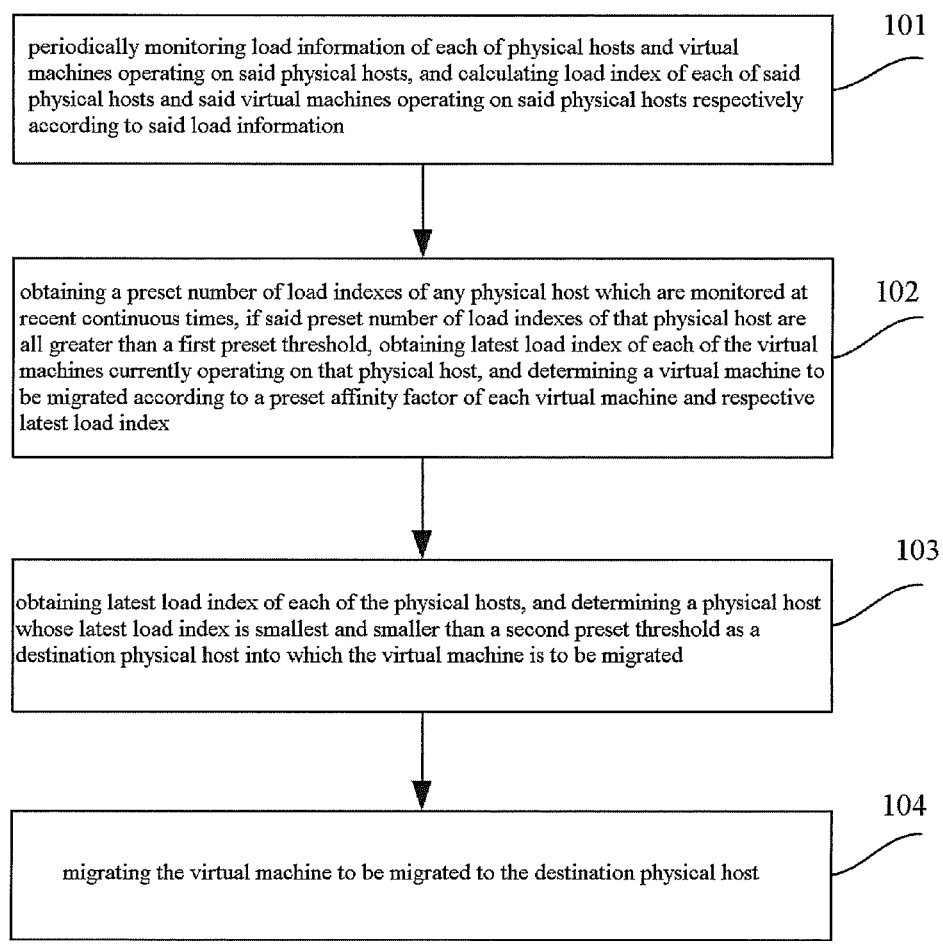
FIG. 1 is a schematic flow chart of a method of realizing load balance of a virtual machine according to an example of the present disclosure.

With the reference to FIG. 1, FIG. 1 is a schematic flow chart of a method of realizing load balance of a virtual machine according to an example of the present disclosure.

At block 101, a virtual machine management platform periodically monitors the load information of each of physical hosts and virtual machines operating thereon, and calculates load index of each of physical hosts and virtual machines respectively according to said load information. The virtual machine management platform operates on a management computer which is communicably connected to each physical host through a network, such as wired network, wireless network, or the like. One or more virtual machines can operate on a physical host. The virtual machine management platform manages all physical hosts in a cluster, including adding a physical host, deleting a physical host, and managing the life-cycle of all virtual machines by adding, deleting and suspending a virtual machine, etc. through the libvirt. In an example, the load information includes but not limited to CPU (Central Processing Unit) usage, memory usage and IO (Input/Output) throughput of a physical host and a virtual machine. A load index of a physical host or a virtual machine is a value calculated based on the load information, and indicates a degree of total workloads of the physical host or the virtual machine.

It is understood that although in this embodiment and other embodiments of the description monitoring is performed periodically, it can be performed in other ways, for example, monitoring continuously.

An illustrative approach of calculating the load indexes of each of physical hosts and virtual machines respectively according to the load information is implemented by: determining the IO throughput factor of a physical host/virtual machine according to respective IO throughput, and calculating the load index of the physical host/virtual machine by weighting load factors such as CPU usage, memory usage and IO throughput factor of the physical host/virtual machine.

An illustrative approach of determining the IO throughput factor according to the IO throughput is implemented by: selecting a maximum IO throughput from the monitored IO throughputs of all of the physical hosts managed by the virtual machine management platform, and calculating the IO throughput factor of each physical host as a ratio of its own IO throughput to the maximum IO throughput; selecting a maximum IO throughput from the monitored IO throughputs of all of the virtual machines on a physical host, and calculating the IO throughput factor of each virtual machine on said physical host as a ratio of its own IO throughput to the maximum IO throughput selected from the monitored IO throughputs of all of the virtual machines on said physical host. The larger the IO throughput factor of a virtual machine, the less should the virtual machine be migrated, because services may be affected during the migration.

In the above illustrative approach of calculating, the IO throughput factor of each of virtual machines on a physical host is respectively carried out with respect to that physical host. That is, said maximum IO throughput used in calculating the IO throughput factor of each of virtual machines on a physical host is not a maximum IO throughput out of IO throughputs of all virtual machines managed by the virtual machine management platform, instead, it is the maximum IO throughput out of IO throughputs of all of the virtual machines on that physical host.

In an example, block 101 is carried out periodically. It is not necessary to carry out block 101 prior to block 102.

At block 102, the virtual machine management platform obtains a preset number of load indexes of a physical host which are monitored at recent continuous times, and if these load indexes of said physical host are all greater than a first preset threshold (which means any virtual machine operating on this physical host should be migrated so as to lower the load of this physical host), the virtual machine management platform obtains the latest load index of each of the virtual machines currently operating on said physical host, and determines a target virtual machine to be migrated according to preset affinity factors of individual virtual machines and their latest load indexes. In an example, for each of physical hosts, the virtual machine management platform determines whether any virtual machine operating on this physical host should be migrated so as to lower the load of this physical host, as recited in block 102. Once a virtual machine operating on any physical host should be migrated, the virtual machine management platform obtains the latest load index of each of the virtual machines currently operating on that physical host, and determines the virtual machine to be migrated, as recited in block 102.

In this and other embodiments of the description, a preset number of load indexes are mentioned. However, it will be appreciated that a real-time load index is also applicable. In this and other embodiments of the description, a physical host whose load index is larger than the first preset threshold is selected as a source physical host on which any virtual machine needs to be migrated so as to reduce its load index. It also will be appreciated that the source physical host can be determined in other ways. For example, a physical host with largest load index is selected as the source physical host.

The preset affinity factor of a virtual machine used in this block indicates the degree of dependency of the virtual machine on the physical host in which it resides. An illustrative approach of determining the virtual machine to be migrated according to the preset affinity factors of individual virtual machines and their latest load indexes is implemented by: weighting the latest load index of each of the virtual machines according to the preset affinity factor thereof, and determining the virtual machine having the maximum weighted value as the virtual machine to be migrated. From this it can be known that when determining whether or not to migrate a virtual machine according to an example of the present disclosure, not only the load index of the virtual machine but also the degree of dependency of the virtual machine on the physical host in which it resides are taken into account. How to set a preset affinity factor and to weight load index according to the preset affinity factor can be determined by a user in accordance with the specific application condition.

At block 103, the virtual machine management platform obtains the latest load index of each of the physical hosts, and determining a physical host whose latest load index is minimum and smaller than a second preset threshold as the destination physical host into which the virtual machine is to be migrated. Alternatively, a physical host whose load index is minimum or smaller than the second preset threshold can be selected as the destination physical.

The second preset threshold used in block 103 is smaller than the first preset threshold in block 102.

At block 104, the virtual machine management platform migrates the virtual machine to be migrated to the destination physical host.

Although the flow diagram described above shows a specific order of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present disclosure.

The above example is with respect to migrating a virtual machine which is operating on a managed physical host into another managed physical host. In another example of the present disclosure in which a virtual machine is to be newly added, the virtual machine management platform obtains the latest load index of each physical host, selects the physical host with the minimum latest load index as the destination physical host, and adds the new virtual machine to said destination physical host.

In an example of the present disclosure, monitoring is performed to virtual machines being operating on individual physical hosts. In this example, if a virtual machine is not operating, then the process thereof cannot be monitored and the load information thereof cannot be obtained.

How to realize balance of loads of virtual machines is described in detail hereinafter by an illustrative example of the present disclosure.

A monitoring period for monitoring the physical hosts and virtual machines, i.e. how often an action of load monitoring is executed for the physical hosts and virtual machines, is set through the virtual machine management platform. The period is 5 minutes by default if not set specifically. An affinity factor is set for each virtual machine to indicate the degree of dependency of the virtual machine on the physical host in which it resides. In an example, the affinity factor can be set to be a percentage value between 0 and 1. The larger the affinity factor of a virtual machine, the more dependent is the virtual machine on the physical host in which it resides. Usually, migration is not allowed (i.e., the affinity factor is 1), and a default value of the affinity factor is 0 which means that the virtual machine is not dependent on the physical host. A first preset threshold is set for triggering a load balancing operation, i.e. triggering the dynamic migration of a virtual machine; a second preset threshold is set for determining whether immigration of other virtual machines is allowed for a physical host.

The virtual machine management platform periodically monitors each of physical hosts and virtual machines operating on respective physical hosts and obtains the monitoring results thereof respectively, i.e. the load information including but not limited to CPU usage, memory usage and IO throughput, etc.

Monitoring of each of the physical hosts by the virtual machine management platform can be realized by using a python script to remotely execute through ssh (secure shell, ssh) relevant statistical command(s), for example, using commands such as command top/iostat on linux.

Individual virtual machine operating on a physical host is in substance simulated through a process of the physical host, so in order to monitor a virtual machine, the relevant statistical command(s) can be remotely executed by using a python script through ssh for the correspond process of the physical host in which the virtual machine resides.

Taking a case as an example in which an operating process of a physical host is KVM and the CPU usage, memory usage and IO throughput of individual virtual machines operating on the physical host are obtained. Usages of CPU and of memory of each of the virtual machines can be obtained by using a python script through top-p pid. The usages of CPU and of memory of a virtual machine obtained herein are not precise values completely conforming to the actual values. Instead, they are equivalent values which represent the actual values in characteristics, that is, said equivalent values increase as the actual values increase and reduce as the actual values decrease. Obtaining the IO throughput is realized by determining virtual machines in a running state on a physical host through a virsh list, retrieving a list of interfaces names from the xml definition of a determined virtual machine and executing relevant command(s) for each of the interfaces one by one according to the interface names so as to obtain IO throughout information. The total number of transmitted bytes and the total number of received bytes of the IO throughput of a virtual machine are obtained by respectively summing together the number of transmitted bytes and the number of received bytes at each of these interfaces under the virtual machine. This is an illustrative example, and it is not intended that the present disclosure is limited to this example.

In an example, the virtual machine management platform can record each monitoring result and calculate load indexes of physical hosts and virtual machines based on the recorded monitoring results when it is required to determine whether any virtual machine needs to be migrated. In another example, the virtual machine management platform may calculate load indexes once a monitoring result is obtained, and record the calculated load indexes in a time order. In this case, the monitoring results may or may not be recorded. The monitoring results can be stored in a database or a document, or stored in the form of a linked list in a memory.

Hereinafter, an example of calculating load index of a physical host i for a monitoring result is described in detail.

The monitoring result is obtained and IO throughput factor of the physical host is calculated as described in the above and in the following. The maximum value ioMax is found from IO throughputs of all physical hosts in the monitoring result. Then the IO throughput percentage value (i.e. IO throughput factor) of the physical host which has the maximum ioMax is 1, and IO throughput percentage value (i.e. IO throughput factor) of each of other physical hosts is a ratio of its own IO throughput io to the maximum value ioMax, i.e., io/ioMax.

The monitoring result $H_i$ for the physical host i including CPU usage, memory usage, IO throughput and the like of the physical host i is obtained, and the load index of the physical host i is calculated according to the preset weight for each of the load factors including CPU usage and memory usage obtained from $H_i$ and IO throughput factor calculated as described in the above, etc.

Assumed that only the three load factors, CPU usage (A), memory usage (B) and IO throughput factor (C) are considered in determining load index, and the preset weighted values are X, Y and Z for A, B and C, respectively, wherein (X+Y+Z)=1. The load index $L_i$ of the physical host i is calculated as $L_i=A_i*X+B_i*Y+C_i*Z$. Assumed that the number of physical hosts in the cluster is hMax, then the value of i is within [0, hMax−1].

In the case where monitoring result is recorded and load index is calculated as needed, a preset number of times N needs to be introduced, then the load index $L_{in}$ of the physical host i for the (n+1)th monitoring result counted from the latest result is $L_{in}=A_{in}*X+B_{in}*Y+C_{in}*Z$, wherein the value of n is within [0, N−1] and for the latest monitoring data it is 0.

In an example, the virtual machine management platform obtains 5 load indexes of each of the physical hosts for corresponding 5 monitoring results monitored continuously. If such 5 load indexes of any physical host all exceed the first preset threshold, then load indexes of the virtual machines on said physical host are calculated. The way of calculating load index of a virtual machine is similar to that of obtaining load index of a physical host described in the above. The difference in calculating load index between a physical host and a virtual machine at least lies in the way of calculating IO throughput factor, as described in the description of block 102 in FIG. 1. In other examples, more or less than 5 load indexes of each of the physical hosts are obtained.

The virtual machine management platform weights the obtained load indexes of respective virtual machines according to respective preset affinity factors. In an example, the weighting to the load index is implemented by an expression $(1-affinity_j)*L_j$, wherein the value of j is within [0, VMax−1], VMax represents the number of virtual machines on said physical host. The value of $(1-affinity_j)$ is obtained by subtracting the preset affinity factor $affinity_j$ of a virtual machine j from 1, and serves as a weight value for the load index $L_j$ of the virtual machine j. The virtual machine having the maximum weighted value is determined as a virtual machine to be migrated. As described in the above, the affinity factor of a virtual machines is set to be a percentage value between [0, 1], wherein 0 represents no dependency, 1 represents great dependency and migration is not suggested. The weight value (1−affinity) means that the larger the affinity factor of a virtual machine, the less willing to be migrated is the virtual machine.

The virtual machine management platform further obtains the latest load index of each of the physical hosts in such a way as stated in the above and selects a physical host having the smallest latest load index. If the smallest latest load index is smaller than the second preset threshold which means a new virtual machine can be added to the physical host, the physical host is used as a destination physical host for a virtual machine to be migrated. Otherwise, no physical host can accept the immigration of the virtual machine to be migrated.

In an example, the virtual machine management platform migrates the virtual machine to be migrated to the destination physical host by using virsh tools of libvirt. In another example, the virtual machine management platform also feeds the result of migration back to the trigger.

In an example, no matter a virtual machine to be migrated can be migrated or not finally, the virtual machine management platform records the aforesaid operations in the form of logs for convenience of the administrator.

In another example of the present disclosure, when it is determined that there is a physical host whose load is too large and a virtual machine thereof needs to be migrated, firstly it is determined whether or not a relatively idle physical host exists, if not, the virtual machine to be migrated on the overloaded physical host will be not determined any more. In actual application, a relatively idle physical host for migration usually exists; otherwise, a new physical host will be added into the system.

Figure 2:
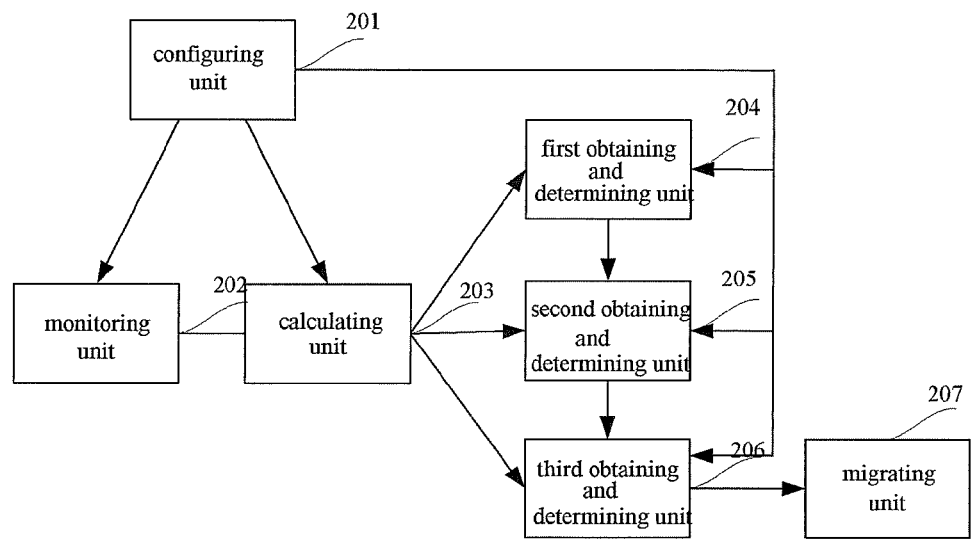
FIG. 2 is a schematic diagram of the structure of the apparatus for balancing virtual machine loads according to an example of the present disclosure.

Based on the same inventive concept as stated above, an apparatus for balancing virtual machine loads is also proposed. Refer to FIG. 2, which is an illustrative diagram of the structure of the apparatus for balancing virtual machine loads according to an example of the present disclosure. In this example, the apparatus comprises: a configuring unit 201, a monitoring unit 202, a calculating unit 203, a first obtaining and determining unit 204, a second obtaining and determining unit 205, a third obtaining and determining unit 206, and a migrating unit 207.

Said configuring unit 201 is used to configure the monitoring period, the preset number, the preset affinity factor of each virtual machine, the first preset threshold, and the second preset threshold, wherein said second preset threshold is smaller than the first preset threshold as described in the above.

Said monitoring unit 202 is used to monitor the load information of each of physical hosts and virtual machines operating thereon according to the monitoring period configured by the configuring unit 201.

Said calculating unit 203 is used to calculate the load indexes of each of physical hosts and virtual machines according to the load information monitored by the monitoring unit 202, for example in a way as described in the above.

Said first obtaining and determining unit 204 is used to obtain a preset number, configured by the configuring unit 201, of load indexes of any physical host which is monitored at recent continuous times and calculated by the calculating unit 203, and determine that these load indexes of said physical host are all greater than the first preset threshold configured by the configuring unit 201.

Said second obtaining and determining unit 205 is used to, when the first obtaining unit 204 determines that those load indexes of any physical host are all greater than the first preset threshold, obtain the latest load index of each of the virtual machines currently operating on that physical host calculated by the calculating unit 203, and determine the virtual machine to be migrated according to the preset affinity factor of each virtual machine configured by the configuring unit 201 and respective latest load index thereof, wherein said preset affinity factor indicates the degree of dependency of the virtual machine on the physical host in which it resides.

Said third obtaining and determining unit 206 is used to, when the first obtaining unit 204 determines that those load indexes of any physical host are all greater than the first preset threshold, obtain the latest load index of each of the physical hosts calculated by the calculating unit 203, and determine the physical host whose latest load index is the smallest and is smaller than the second preset threshold configured by the configuring unit 201 as the destination physical host of the virtual machine to be migrated.

Said migrating unit 207 is used to migrate the virtual machine to be migrated determined by the second obtaining and determining unit 205 to the destination physical host determined by the third obtaining and determining unit 206.

In an example, said second obtaining and determining unit 205 is used to weight the latest load index of each of virtual machines according to respective preset affinity factor of each virtual machine, and use the virtual machine having the largest weighted value as the virtual machine to be migrated.

In an example, said monitoring unit 202 is used to: use the python script to remotely execute relevant statistical command(s) through ssh so as to obtain the load information of each physical host in periodically monitoring each physical host; and in periodically monitoring each of the virtual machines operating on the physical hosts, use the python script to remotely execute relevant command(s) through ssh to obtain the load information of a virtual machine from the corresponding process of the physical host where said virtual machine resides, wherein, said load information include but not limited to CPU usage, memory usage and IO throughput, and said relevant statistical command(s) are determined based on the running process of the physical host.

In an example, said calculating unit 203 is used to determine the IO throughput factor according to the IO throughput, and weight CPU usage, memory usage and the IO throughput factor to calculate the load index.

In an example, said calculating unit 203 is used to: select a maximum IO throughput from the IO throughputs of all of the physical hosts monitored by the monitoring unit 202, and then the IO throughput factor of each physical host is a ratio of its own IO throughput to the maximum IO throughput; and select a maximum IO throughput from the IO throughputs of all of the virtual machines on a physical host monitored by the monitoring unit 202, and the IO throughput factor of each virtual machine on said physical host is a ratio of its own IO throughput to the maximum IO throughput selected from the IO throughputs of all of the virtual machines on said physical host.

In an example, said third obtaining and determining unit 206 is further used to, when adding a new virtual machine, obtain the latest load index of each physical host calculated by the calculating unit 203, and select the physical host with the smallest latest load index, and add the new virtual machine onto said physical host.

The aforesaid units discussed in the above can be integrated or arranged separately. These units can be combined into one unit or subdivided into a plurality of sub-units.

The above examples can be implemented by hardware, software or firmware or a combination thereof. For example the various methods, processes and functional modules described herein may be implemented by a processor (the term processor is to be interpreted broadly to include a CPU, processing unit, ASIC, logic unit, or programmable gate array etc.). The processes, methods and functional modules may all be performed by a single processor or split between several processors; reference in this disclosure or the claims to a 'processor' should thus be interpreted to mean 'one or more processors'. The processes, methods and functional modules be implemented as machine readable instructions executable by one or more processors, hardware logic circuitry of the one or more processors or a combination thereof. Further the teachings herein may be implemented in the form of a software product. The computer software product is stored in a storage medium and comprises a plurality of instructions for making a computer device (which can be a personal computer, a server or a network device such as a router, switch, access point etc.) implement the method recited in the examples of the present disclosure.

All of the features disclosed in this specification (including any accompanying claims, abstract and drawings), and/or all of the processes or blocks of any method so disclosed, may be combined in any combination, except combinations where at least some of such features and/or processes or blocks are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

Examples of the present disclosure determine a dynamic migration action of a virtual machine by comprehensively considering load information such as CPU usage, memory usage and IO throughput of physical hosts and virtual machines, whereby load balancing of virtual machines distribution is realized, and smooth migration of a virtual machine is effectively enhanced so that influence on the virtual machine caused by migration of the virtual machine with high memory usage and IO throughput is avoided.

Through examples of the present disclosure, it is not required to mount a proxy in advance on a physical host or a virtual machine, whereby complexity and cost are reduced. In some example, not only CPU load of a physical host but also load of a virtual machine on said physical host are taken into account. In an example, an affinity factor of a virtual machine that represents the degree of dependency of the virtual machine on the physical host in which it resides is configured, and dynamic migration is less suggested with the increase of the affinity factor.

In the above description, the drawings are merely schematic drawings of an example, and the modules or flows in the drawings are not necessary essential for carrying out the disclosure. The above sequential numbers mentioned are only for facilitating description, but they are not used to represent which example is more advantage. The above description includes examples. Any modification, equivalent substitution and improvement made that are according to the spirit and principle of the examples shall be included in the protection scope.

What is claimed is:

1. A method for balancing virtual machine loads comprises:

monitoring load information of each of physical hosts and virtual machines operating on the physical hosts;

calculating a load index of each of the physical hosts and the virtual machines operating on the physical hosts respectively according to the load information;

based on the load index of each of the physical hosts, determining a source physical host on which any virtual machine needs to be migrated so as to reduce the load index of the source physical host, wherein determining the source physical host comprises at least one of selecting a physical host with a largest load index as the source physical host, selecting a physical host with a load index larger than a first preset threshold as the source physical host, and selecting a physical host whose load index is always larger than the first preset threshold in a preset number of recent monitoring measurements;

determining a target virtual machine to be migrated on the source physical host based on the load index of each of the virtual machines on the source physical host and respective affinity factor indicating a degree of dependency of a virtual machine on a physical host on which it resides; and migrating the target virtual machine into a destination physical host different than the source physical host.

2. The method according to claim 1, wherein the destination physical host is determined by at least one of
selecting a physical host with a smallest load index as the destination physical host,
selecting a physical host with a load index smaller than a second preset threshold as the destination physical host, and
selecting a physical host whose load index is smallest and smaller than the second preset threshold as the destination physical host.

3. The method according to claim 1, wherein determining a target virtual machine to be migrated comprises:
weighting the load index of each of the virtual machines on the source physical host according to a respective preset affinity factor of each of the virtual machines; and
selecting a virtual machine having a largest weighted load index value as the target virtual machine to be migrated.

4. The method according to claim 1, wherein the monitoring the load information of each of the physical hosts and virtual machines operating on the physical hosts comprises:
in monitoring each physical host, using a python script to remotely execute a relevant statistical command through a security shell (ssh) so as to obtain the load information of each physical host; and
in monitoring each of the virtual machines operating on the physical hosts, using a python script to remotely execute a relevant command through the ssh so as to obtain the load information of the virtual machine from a corresponding process of the physical host in which the virtual machine resides,
wherein the load information includes central processing unit (CPU) usage, memory usage and input/output(IO) throughput, and the relevant statistical command is determined according to running processes of the physical hosts.

5. The method according to claim 4, wherein the calculating the load index of each of the physical hosts and the virtual machines operating on the physical hosts respectively according to the load information comprises:
determining an IO throughput factor according to the IO throughput, and weighting the CPU usage, the memory usage and the IO throughput factor to calculate the load index.

6. The method according to claim 5, wherein the determining the IO throughput factor according to the IO throughput comprises:
selecting a maximum IO throughput from monitored IO throughputs of all of the physical hosts, and calculating the IO throughput factor of each physical host as a ratio of an IO throughput of the physical host to the maximum IO throughput; and
selecting a maximum IO throughput from the monitored IO throughputs of all of the virtual machines on a physical host, and calculating the IO throughput factor of each virtual machine on the physical host as a ratio of the IO throughput of the physical host to the maximum IO throughput selected from the monitored IO throughputs of all of the virtual machines on the physical host.

7. The method according to claim 1, further comprising when adding a new virtual machine:
selecting a physical host with a smallest load index, and adding the new virtual machine onto the physical host.

8. An apparatus for balancing virtual machine loads comprising:
a hardware processor; and
a memory storing machine readable instructions that when executed by the hardware processor cause the hardware processor to:
configure a preset affinity factor of each virtual machine;
monitor load information of each of physical hosts and virtual machines operating on the physical hosts;
calculate a load index of each of the physical hosts and the virtual machines according to the monitored load information;
obtain the calculated load index of each physical host, and determine a source physical host on which any virtual machine needs to be migrated so as to reduce the load index of the source physical host;
based on determination of the source physical host, obtain the calculated load index of each of virtual machines currently operating on the source physical host, and determine a target virtual machine to be migrated according to a preset affinity factor of each configured virtual machine and respective load index, wherein the preset affinity factor of a virtual machine indicates a degree of dependency of the virtual machine on a physical host in which the virtual machine resides;
based on determination of the source physical host, obtain the calculated load index of each of the physical hosts, and determine a destination physical host into which the target virtual machine is to be migrated; and
migrate the target virtual machine into the destination physical host.

9. The apparatus according to claim 8, further comprising machine readable instructions that when executed by the hardware processor further cause the hardware processor to:
weight the load index of each virtual machine according to the respective preset affinity factor of each virtual machine, and use the virtual machine having a largest weighted load index value as the target virtual machine to be migrated.

10. The apparatus according to claim 8, further comprising machine readable instructions that when executed by the hardware processor further cause the hardware processor to:
use a python script to remotely execute a relevant statistical command through a security shell (ssh) so as to obtain the load information of each physical host in monitoring each physical host; and
in monitoring each of the virtual machines operating on the physical hosts, use a python script to remotely execute a relevant command through ssh to obtain the load information of the virtual machine from a corresponding process of the physical host where the virtual machine resides,
wherein the load information includes central processing unit (CPU) usage, memory usage and input/output (IO) throughput, and the relevant statistical command is determined according to running processes of the physical hosts.

11. The apparatus according to claim 10, further comprising machine readable instructions that when executed by the hardware processor further cause the hardware processor to:
    determine an (IO) throughput factor according to the IO throughput, and weight the CPU usage, the memory usage and the IO throughput factor to calculate the load index.

12. The apparatus according to claim 11, further comprising machine readable instructions that when executed by the hardware processor further cause the hardware processor to:
    select a maximum IO throughput from IO throughputs of all of the monitored physical hosts, and calculate the IO throughput factor of each physical host as a ratio of the IO throughput of the physical host to the maximum IO throughput; and
    select a maximum IO throughput from IO throughputs of each of the virtual machines on a monitored physical host, and calculate the IO throughput factor of each virtual machine on the physical host as a ratio of the IO throughput of the virtual machine to the maximum IO throughput selected from IO throughputs of each of the virtual machines on the monitored physical host.

13. The apparatus according to claim 8, further comprising machine readable instructions that when executed by the hardware processor further cause the hardware processor to:
    when adding a new virtual machine, obtain the calculated load index of each physical host select a physical host with a smallest latest load index, and add the new virtual machine onto the physical host.

14. A method for balancing virtual machine loads comprising:
    monitoring load information for physical hosts and virtual machines operating on the physical hosts;
    calculating a load index for each physical host of the physical hosts and each virtual machine of the virtual machines based on the load information;
    choosing a virtual machine to be migrated, based on the load indexes of the virtual machines and an affinity factor indicating a degree of dependency of the virtual machine on the physical host on which it resides;
    determining a physical host as a destination physical host to migrate the virtual machine to, wherein the destination physical host is determined by at least one of
        selecting a physical host with a smallest load index as the destination physical host,
        selecting a physical host with a load index smaller than a preset threshold as the destination physical host, and
        selecting a physical host whose load index is smallest and smaller than the preset threshold as the destination physical host; and
    migrating the chosen virtual machine to the destination physical host.

15. The method according to claim 14, wherein determining the virtual machine to be migrated comprises:
    weighting the load index of each of the virtual machines according to a respective preset affinity factor of each of the virtual machines; and
    selecting a virtual machine having a largest weighted load index value as the virtual machine to be migrated.

* * * * *

UNITED STATES PATENT AND TRADEMARK OFFICE
CERTIFICATE OF CORRECTION

PATENT NO.        : 9,286,099 B2                                      Page 1 of 1
APPLICATION NO.   : 14/345653
DATED             : March 15, 2016
INVENTOR(S)       : Zhifeng Cai It is certified that error appears in the above-identified patent and that said Letters Patent is hereby corrected as shown below:

Claims

In column 11, line 4, in Claim 11, delete "(IO)" and insert -- IO --, therefor.

Signed and Sealed this
Fifth Day of July, 2016

Michelle K. Lee
*Director of the United States Patent and Trademark Office*